(12) United States Patent
Lecorre et al.

(10) Patent No.: US 10,569,705 B2
(45) Date of Patent: Feb. 25, 2020

(54) LIGHTING DEVICE FOR MOTOR VEHICLES

(71) Applicant: VALEO VISION, Bobigny (FR)

(72) Inventors: Jerome Lecorre, Bobigny (FR); Pierre-Louis Tassy, Bobigny (FR); Birane Gaye, Bobigny (FR); Thierry Fleurence, Bobigny (FR); Aymeric Koniec, Bobigny (FR)

(73) Assignee: VALEO VISION, Bobigny (FR)

( * ) Notice: Subject to any disclaimer, the term of this patent is extended or adjusted under 35 U.S.C. 154(b) by 82 days.

(21) Appl. No.: 15/441,674

(22) Filed: Feb. 24, 2017

(65) Prior Publication Data

US 2017/0240105 A1 Aug. 24, 2017

(30) Foreign Application Priority Data

Feb. 24, 2016 (FR) ...................................... 16 51520

(51) Int. Cl.
*B60Q 3/62* (2017.01)
*B60Q 3/74* (2017.01)
*B60Q 3/80* (2017.01)
*B60Q 3/64* (2017.01)
*B60Q 3/51* (2017.01)
*F21V 5/04* (2006.01)
*F21V 8/00* (2006.01)
*F21Y 105/10* (2016.01)
*F21Y 113/13* (2016.01)
*F21Y 115/10* (2016.01)

(52) U.S. Cl.
CPC ................. *B60Q 3/62* (2017.02); *B60Q 3/51* (2017.02); *B60Q 3/64* (2017.02); *B60Q 3/74* (2017.02); *B60Q 3/80* (2017.02); *F21V 5/04* (2013.01); *G02B 6/005* (2013.01); *F21Y 2105/10* (2016.08); *F21Y 2113/13* (2016.08); *F21Y 2115/10* (2016.08)

(58) Field of Classification Search
CPC ... B60Q 3/62; B60Q 3/64; B60Q 3/51; B60Q 3/80; B60Q 3/74; B60Q 3/20; F21V 5/04; F21V 2200/00; F21V 2200/13; G02B 6/005; G02B 6/00; G02B 6/0008; G02B 6/0075; G02B 6/0076; G02B 6/0073; F21Y 2113/13; F21Y 2105/10; F21Y 2115/10; F21Y 2113/10
USPC ........................................................ 362/511
See application file for complete search history.

(56) References Cited

U.S. PATENT DOCUMENTS

| | | | |
|---|---|---|---|
| 2010/0188018 A1* | 7/2010 | Salm | F21V 7/00 315/294 |
| 2010/0315826 A1* | 12/2010 | Anderson | G02B 6/001 362/511 |
| 2014/0133142 A1* | 5/2014 | Jorgensen | F21V 14/04 362/231 |
| 2014/0362600 A1* | 12/2014 | Suckling | F21S 48/1225 362/583 |
| 2016/0076721 A1* | 3/2016 | Meyrenaud | F21S 41/24 362/522 |

* cited by examiner

*Primary Examiner* — Bao Q Truong
(74) *Attorney, Agent, or Firm* — Oblon, McClelland, Maier & Neustadt, L.L.P.

(57) ABSTRACT

A lighting system for a motor vehicle passenger compartment includes a light beam shaping device and an projection optical element configured to convert the light beam into an output beam. The beam shaping device is configured to emit a pixelized light beam formed of a plurality of sub-beams.

13 Claims, 3 Drawing Sheets

LIGHTING DEVICE FOR MOTOR VEHICLES

The present invention notably relates to a lighting system.

One preferred application concerns the automotive industry, for the equipment of vehicles, in particular for the production of devices liable to be able to emit light beams, also known as lighting functions, inside the passenger compartment of the vehicle. The term lighting is to be understood as including signaling in a portion of the passenger compartment and possible decorative lighting effects.

The passenger compartment of a vehicle is conventionally provided with a plurality of lighting devices. For example, there are often present an overhead light and reading lights. In the case of the overhead light, it is typically generally possible to activate a lighting system directing light toward the driver side and, separately, a lighting system directing light toward the passenger side. This calls for as many systems as there are types of lighting required. The functionalities of these lighting systems are therefore limited.

The invention seeks to improve the definition of the interior lighting beams in the passenger compartment of motor vehicles.

The present invention concerns a lighting system for a motor vehicle passenger compartment. It includes a light beam shaping device and a projection optical element configured to convert the light beam into an output beam. The beam shaping device is advantageously configured to emit a pixelized light beam formed of a plurality of sub-beams.

This type of lighting system makes it possible to modify the lighting configurations to be produced because the shape of the beam is pixelized and so the beam can easily be modified by control means. These modifications do not necessitate modification of the projection optical element. For example, a single system according to the invention can serve as an overhead light with a function of directing light toward the driver, a function of directing light toward the front passenger, a function of directing light toward the rear passengers and an overall lighting function. Advantageously only how the pixels of the beam are controlled is modified between these different functions. This principle may equally well be applied at the level of a comfort handle situated near the upper edge of a window, at the level of the feet at the base of the seats or at the level of the roof pillars.

Accordingly, whereas it might have been thought a priori that the use of pixelized beams is complicated and unsuitable for lighting passenger compartments, the invention makes it possible to rationalize the installations of the passenger compartment by limiting the lighting elements at the same time as increasing their functions.

The system is advantageously configured so that the light beam is chosen from a plurality of beam configurations each corresponding to a different combination of sub-beams activated. The activation of the sub-beams may be turning them on or turning them off and also varying the luminous intensity or other light parameters. Each combination of sub-beams may correspond to a required lighting function.

According to one possibility, the beam shaping device includes a plurality of light sources each able to emit a sub-beam able to participate in the pixelized light beam.

Accordingly, each sub-beam can correspond to a source that can be controlled to switch it on or off and/or to control its intensity. For example, at least one of the light sources includes at least two elementary light emitters, so that it is possible to control the emitters individually to modify the corresponding sub-beam.

According to one possibility, at least two of the at least two light emitters are configured to emit light beams of different colors. Their contribution to the sub-beam from the source concerned can therefore be complementary and this can make possible variations, for example of color, by controlling each emitter or some of them differently. Optionally, the at least one light source that includes at least two elementary light emitters is a light-emitting diode with at least two chips, for example at least ten chips. A chip of a light-emitting diode means a semi-conductor component able to emit photons when it is electrically exited. It also forms the light emitter, either by itself, or in association with a luminophore which converts the wavelength of the light emitted by the chip. This means for example matrices of 2*30 chips, or more generally matrices made up of rows and columns, each row including at least 5 elementary light emitters (i.e. smallest selectively activatable lighting units), preferably at least 10 elementary light emitters.

Either said, the system may have light sources comprising two light emitters, in particular light emitters emitting different colors, said light sources being disposed according to a matrix of lines and columns on a support, for instance a matrix of 5 lines and 6 columns of light emitting diodes with two chips, also called bi-chip LED. Alternatively, the system may have one unique light source comprising numerous light emitters disposed, advantageously by pair of light emitters emitting different colors, according lines and columns inside a same light source housing.

The present invention also concerns a vehicle equipped with at least one lighting system according to the present invention.

It may include a lighting system of this kind at the level of a comfort handle at the edge of the ceiling of the passenger compartment (for example near a door) and/or an overhead lighting system of the passenger compartment.

The invention also relates to a method of lighting the passenger compartment of a vehicle.

That method therefore makes it possible to adapt the lighting as a function of requirements, with of the same system, notably with only one optical part. Control electronics preferably make it possible to utilize fully all of the degrees of freedom allowed by the present invention.

Other features and advantages of the present invention will be better understood in the light of the description and the drawings, which show illustrative embodiments of the invention and in which.

In the following description similar reference numbers will be used to describe similar concepts across different embodiments of the invention.

Unless specifically indicated to the contrary, technical features described in detail for a given embodiment may be combined with technical features described in the context of other embodiments described by way of nonlimiting example.

The term pixelized beam and its equivalents refer to, for a device emitting a light beam, that said light beam is formed of a plurality of sub-beams, each sub-beam being controllable independently of the other sub-beams. Each independently controllable sub-beam forms a pixelized ray.

Before describing embodiments of the invention in detail, notably with reference to the drawings, potential options that the invention may feature, separately or in all combinations, are briefly introduced below:

- the beam shaping device includes a plurality of light source each able to emit a sub-beam able to participate in the pixelized light beam;
- at least one of the light sources includes at least two elementary light emitters;
- at least two of the at least two light emitters are configured to emit different colors;
- the at least one light source that includes at least two elementary light emitters is a light-emitting diode with at least two chips;
- the beam shaping device includes a waveguide associated with each light source, each waveguide including an input diopter for light emitted by the associated light source and an output diopter for light transmitted toward the projection optical element;
- the waveguides have a polygonal section with dimensions increasing from the input diopter toward the output diopter;
- the projection optical element includes a lens the input diopter of which is configured to receive at least a part of the light transmitted by the output diopter of the waveguides;
- the output diopter of the waveguides is in contact with the input diopter of the lens;
- the projection optical element includes an additional lens on the path of the light issuing from the lens;
- the additional lens is a convergent lens;
- the projection optical element includes an output reflector of the output beam;
- the reflector is plane;
- the reflector is convergent;
- the system includes means for controlling the sub-beams individually.

One particular embodiment of the present invention will now be described that is illustrated by way of nonlimiting example by the following figures.

Figure 1:
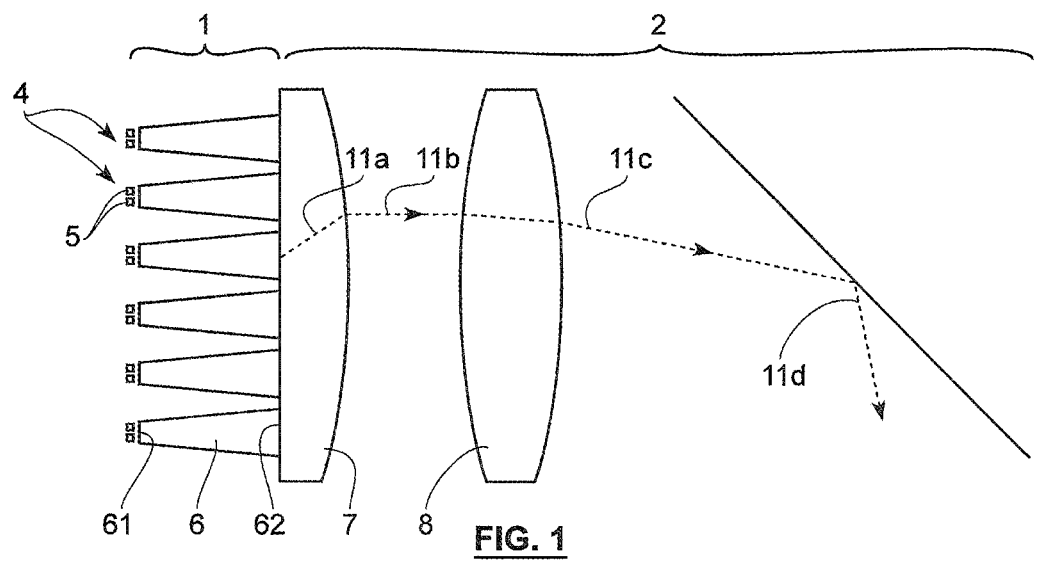
FIG. 1 shows a theoretical view of one embodiment of the invention.

FIG. 1 shows diagrammatically one embodiment of the system of the invention. The system therein includes, from an upstream zone toward a downstream zone along the path of the light rays produced by the system, a beam shaping device 1 and an projection optical element 2. In itself, the beam shaping device preferably includes a part generating light rays and an optical part making it possible to deliver appropriate pixelized rays to the projection optical element 2. The part generating light rays includes a plurality of light sources 4.

Generally speaking, the present invention may use light sources of the light-emitting diode (LED) type. In particular, these LEDs may include at least one chip adapted to emit light that is advantageously of adjustable intensity according to the lighting function to be implemented. The chips may be juxtaposed perpendicularly to the mean direction of emission of the LED. There may be a plurality of sources as explained in more detail hereinafter. Moreover, here the term light source is to be understood as referring to a combination of at least one elementary emitter such as an LED able to produce a flux leading to the generation at the output of the system of the invention of at least one output light sub-beam participating in at least one required function. Other types of source may also be envisaged in the context of the invention. The term LED also encompasses OLEDs (organic light-emitting diodes).

In the case of FIG. 1, each source 4 includes two elementary emitters 5 (or chips) so as to make possible great flexibility in the generation of light. Actually, some or all of the sources may advantageously produce a controllable individual sub-beam (and thus one pixel of the overall beam) with variable lighting parameters, such as the intensity of each emitter 5 or the color of the source 4, by controlling the emitters 5 individually. The latter preferably emit different colors. To make possible progressive variation between two colors, the sources 4 facing a light guide are different colors, for example, white and amber, for example.

The control of each source 4 and of each emitter is therefore to be understood as meaning not only turning it on or turning it off but also varying a parameter of the emitted light.

The FIG. 1 illustration shows that the sources are preferably situated in a plane, which is vertical in FIG. 1. The sources 4 may be organized in an array in such a plane. The sources 4 are for example aligned in a principal direction or organized in two directions, for example in an array made up of rows and columns. Any other installation configuration of the sources 4 is possible. They are preferably spaced regularly and equidistantly in an installation plane. That plane is typically the surface of an LED support board such as for example a printed circuit board (PCB). A board 15 of this kind can be seen in FIG. 4. It may serve at least in part to control the sources 4 by powering them selectively. On this board 15 or separately the sources may be controlled, for example by a processor and means for programming one or more different lighting functions. This possibility is shown in the FIG. 4 example with a control board 16. According to one possibility, the control board 16 receives an instruction to activate a lighting function from any means (pressing a pushbutton, a command coming from the dashboard, a signal generated by an onboard computer interface, a sensor, for example of a door opening, etc.). The board 16 processes this instruction by identifying the control configuration of the corresponding sources and transmitting to the board 15 indications of the electrical power supply configurations of the sources, notably by applying a power supply setpoint to each emitter 5 of each source 4.

It is advantageous to process optically the rays emitted by the sources 4. To this end, the device 1 may include an optical part preferably provided with a plurality of waveguides 6, advantageously one waveguide 6 for each source 4. In the case of FIG. 1, the waveguides 6 have a peripheral envelope flared from a proximal end of the guide toward a distal end of the guide. This may be a conical or other envelope. The guide may be made of polycarbonate, polymethylmethacrylate (PMMA) or silicone, for example. The cross section of the guide is preferably polygonal, but may also be circular. At the proximal end is an input diopter 61 through which the rays emitted by the source 4 enter the guide. This may be a face of the guide transverse to its envelope. The guide 6 is preferably configured to propagate the rays within it by internal reflection to an output diopter 62 at the distal end of the guide. This diopter may be a face of the guide transverse to its envelope.

The projection optical element receiving the rays leaving the device may have a configuration that can be varied according to the application. It may include a function of deflection of the rays and/or a focusing or divergence and/or diffusion and/or diffraction and/or filtration (for example by means of a colored surface, etc.) function.

The projection optical element 2 may include a plurality of components each adapted to implement one or more optical functions. In a situation that is not shown, the projection optical element 2 may include or consist in an at least partly transparent or translucent cap, which can be optically neutral.

As in FIG. 1, it may also further include (at least) one lens 7. That lens 7 is preferably common to all the output diopters 62 of the guides so as to combine the rays produced by all the active sources. In the case of FIG. 1, the input diopter of the lens is in contact with the output diopter 62 so as to produce a compact device 1. The lens 7 may be in one piece with the guides 6. In FIG. 1, the rays exit the device 1 via the output diopter of the lens 7. The latter is preferably a convergent lens and may for example have a plano-convex configuration. Its plane diopter can make possible good cooperation with the output diopters 62 of the guides, which may also be plane. The path 11*a* of a ray in the lens 7 and its exit 11*b* are shown diagrammatically.

According to one option, the optical axis of the device 1 is not that required for the rays to exit the complete system. To this end, the projection optical element 2 may provide a deflection function, as is the case in FIG. 1. In fact, it is possible to produce a system with a relatively elongate overall outside shape in the direction of the optical axis of the device 1, dispose the system parallel to a wall of the passenger compartment and divert the rays in a required output direction. Accordingly, FIG. 1 shows a reflector 3 serving to deflect the rays before they exit. The direction of the ray 11*d* is therefore deflected relative to the ray 11*c* received by the reflector 3. The latter may notably be a plane mirror or a concave or convex mirror. Without limiting the invention, the deflection may be 90°+/−30°.

According to the FIG. 1 example, the projection optical element also includes an additional lens 8, preferably serving to concentrate the beam. It is a biconvex lens for example.

In FIG. 1, it is disposed between the lens 7 and the reflector 3 and oriented along the optical axis of the lens 7.

Figure 2:
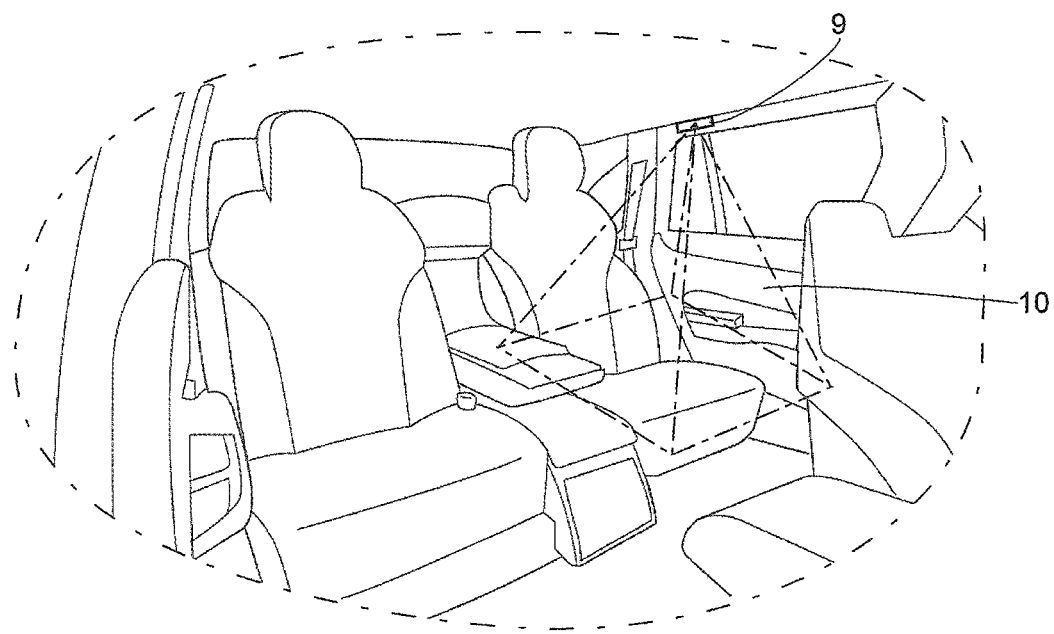
FIG. 2 shows a possible installation of a system of the invention in the passenger compartment of a motor vehicle.
Figure 3:
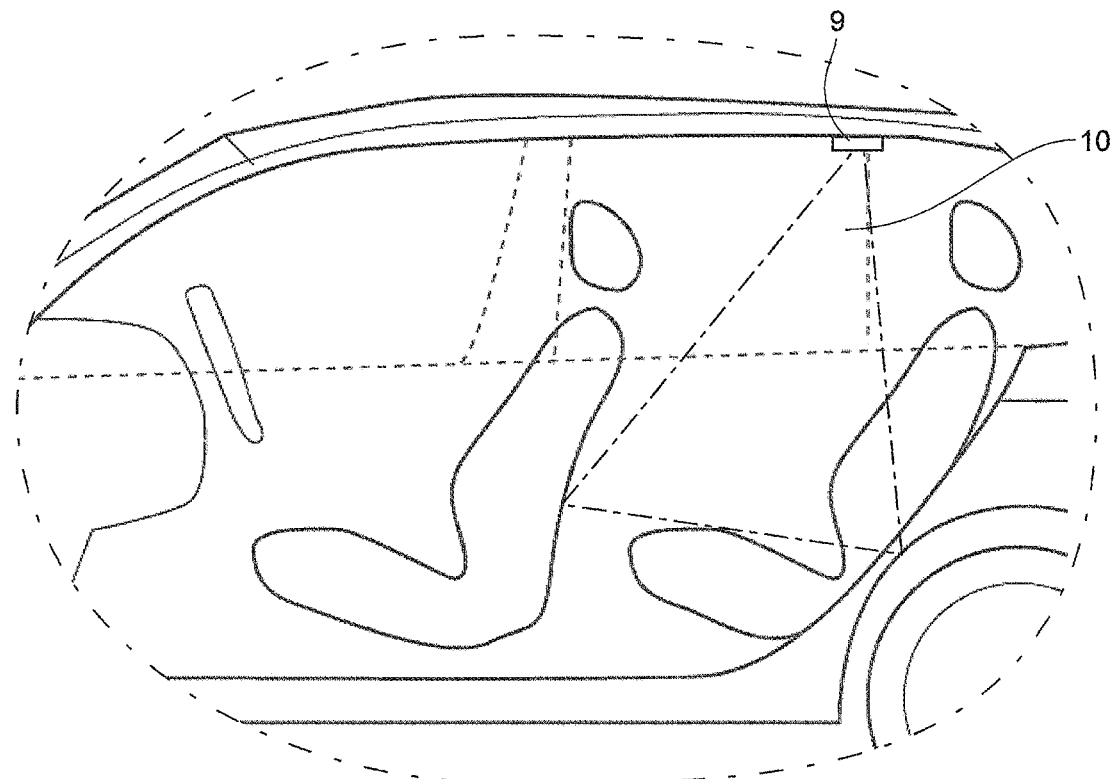
FIG. 3 shows the installation from FIG. 2 from the side.

The proposed system can be compact and easy to install. FIGS. 2 and 3 illustrate this by a system fixed in the passenger compartment so as to equip the upper perimeter of a door, for example at the level of a comfort handle 9. The system of the invention may be on or integrated into that handle. One example of a zone 10 that can be illuminated is shown diagrammatically; thanks to the invention this zone may for example be divided into three sections each corresponding to one predefined lighting function and each implying a different activation of the sources 4 and therefore of the different sub-beams to compose the lighting beam of the function. Note that the volume illuminated is not necessarily continuous and may include a plurality of separate portions of the space. There is nothing to exclude a lighting function being configured to generate a beam variable over time and for example periodically (the intensity and/or the illuminated zone varying cyclically) and/or with a phase of increasing and/or decreasing luminous intensity.

Figure 4:
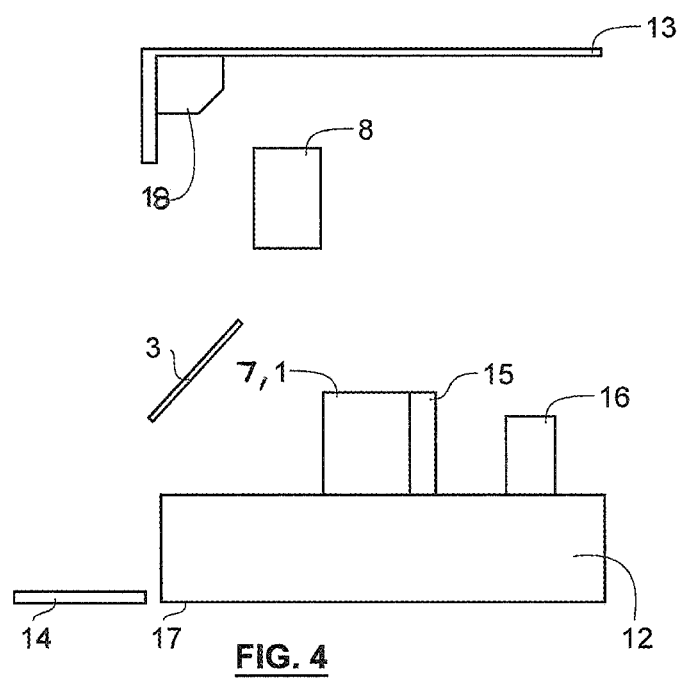
FIG. 4 shows an exploded view of one possibility of integration of the invention into a module that can be mounted in a passenger compartment.

A concrete instance of this is shown in FIG. 4. There a module 12 encloses the components described above, namely the device 1, the projection optical element, here with the lens 7, 8 and the reflector 3, together with a board 15 supporting the sources, notably in the form of LEDs, and a control board 16. Slideways can receive these components successively in a longitudinal direction of the system corresponding to the optical axis of the device 1. In this example the rays exit via a zone 17 at 90° to the longitudinal axis of the system. The zone 17 is for example a window in the module 12. That window may itself be equipped with a protective glass 14. Finally, a cap 13 may close the module 12 once the components have been mounted. The slideways prevent movement of the components in translation in the longitudinal direction and the cap 13 cooperates with the facing bottom of the module to prevent any residual transverse movement. The periphery of the reflector 3 may be mounted on a frame. A bearing rib 18 preferably projects from the internal face of the cap to immobilize the reflector 3 via its rear face.

Figure 5:
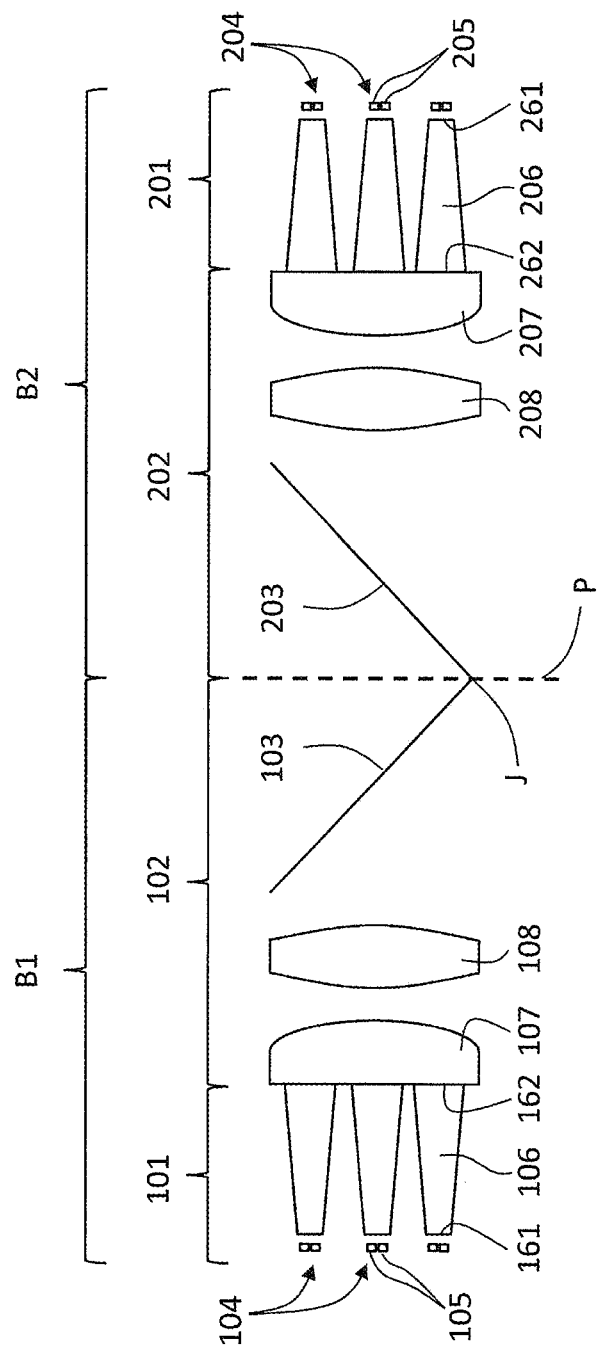
FIG. 5 shows a theoretical view of one alternative embodiment of the invention.

FIG. 5 shows diagrammatically one alternative embodiment of the system of the invention. In this embodiment the system comports two branches B1, B2.

Each branch is composed by the elements as described above for FIG. 1. The reference of identical elements is increased by 100 for the elements of branch B1 and by 200 for those of branch B2.

The branches B1 and B2 are disposed on either sides of a median plane P showed with dotted line.

Advantageously, the branches B1 and B2 are arranged symmetrically in mirror image relative to the median plane P.

In the alternative showed on FIG. 5 the reflectors 103 and 203 are connected. They form an assembly having a V-shape profile. The junction edge J of the two reflectors is situated in P plane. Alternatively, if the branches are dissymmetrical versus each other, or if the reflectors 103, 203 are curved, the junction edge can be situated outside of the plane P.

Alternatively the reflectors 103 and 203 are two parts disposed separately.

Advantageously the elements composing the branches B1 and B2 have symmetry axis so that they can be used in both branches B1 and B2 just by a rotation of said elements. Accordingly it is possible to produce the whole system economically with a reduced number of element types that has to be manufactured.

Alternatively the elements can be different from one branch to another one. As example the number of light sources 104, and of associated waveguides, may differ from the number of light sources 204, and of associated waveguides. Likewise, the nature and the form of the optical parts composing the projection optical element 102, 202 may vary from one branch to the other one.

This alternative embodiment can be integrated in a module that can be mounted in a passenger compartment, as presented on FIG. 4. The reflectors 103 and 203 are then positioned in front of the window 17 shared by the two branches B1 and B2. Alternatively the housing 12 can comport two windows, one for each branch B1, B2.

This alternative embodiment has, compared to the embodiment described on FIG. 1, the advantage to reduce the footprint of the system in a direction parallel to the plane of the light sources. It allows easiest integration of such a system in the passenger compartment, particularly in an area where only small height and/or depth is available.

Another advantage, given by distributing the light sources on several remote supports, is to limit the thermal heating and heat management of said light sources.

Another advantage is to make easier the driving of light sources. Actually it is easier to implement an electronic board for driving a reduced number of light sources than an electronic board for driving a high number of light sources. Accordingly by distributing the light sources on several remote supports, the number of light sources to be driven by one given electronic board is reduced compared to the embodiment described on FIG. 1. The global electronic driving of the system is then simplified.

The invention is not limited to the embodiments described but encompasses any embodiment conforming to its spirit.

The invention claimed is:

1. A lighting system for a motor vehicle passenger compartment comprising:
   a beam shaping device; and
   a projection optical element configured to convert a light beam outputted by the beam shaping device into an output beam, wherein
   the beam shaping device is configured to emit a pixelized light beam formed of a plurality of sub-beams,
   the beam shaping device includes a plurality of waveguides and a plurality of active light emitter sources associated with respective waveguides, each active light emitter source emitting a sub-beam into a respective waveguide to participate in the pixelized light beam, and
   the projection optical element includes an output reflector of the output beam, wherein
   at least one of the active light emitter sources includes at least two elementary light emitters, at least one of the at least two elementary light emitters is a semiconductor light emitter, and the at least two elementary light emitters are configured to emit light beams of different colors.

2. The lighting system according to claim 1, wherein the at least one active light emitter source that includes at least two elementary light emitters is a light-emitting diode with at least two chips.

3. The lighting system according to claim 1, wherein each waveguide includes an input for light emitted by the associated active light emitter source and an output for light transmitted toward the projection optical element.

4. The lighting system according to claim 3, wherein the waveguides have a polygonal section with dimensions increasing from the input toward the output.

5. The lighting system according to claim 1, wherein the projection optical element includes a lens, an input of which is configured to receive at least a part of the light transmitted by the output of the waveguides.

6. The lighting system according to claim 5, wherein the output of the waveguides is in contact with the input of the lens.

7. The lighting system according to claim 5, wherein the projection optical element includes an additional lens on the path of the light emitted from the lens.

8. A vehicle, comprising:
   at least one lighting system that includes
   a beam shaping device, and
   a projection optical element configured to convert a light beam outputted by the beam shaping device into an output beam, wherein
   the beam shaping device is configured to emit a pixelized light beam d of a plurality of sub-beams,
   the beam shaping device includes a plurality of waveguides and a plurality of active light emitter sources associated with respective waveguides each active light emitter source emitting a sub-beam into a respective waveguide to participate in the pixelized light beam, and
   the projection optical element includes an output reflector of the output beam, wherein
   at least one of the active light emitter sources includes at least two elementary light emitters, at least one of the at least two elementary light emitters is a semiconductor light emitter, and the at least two elementary light emitters are configured to emit light beams of different colors.

9. The vehicle according to claim 8, wherein the at least one lighting system is provided at a level of a comfort handle at an edge of a ceiling of a passenger compartment.

10. The vehicle according to claim 8, wherein the at least one lighting system is provided in the ceiling of a passenger compartment.

11. The lighting system according to claim 2, wherein the at least one active It t emitter source that includes at least two elementary light emitters is a light-emitting diode with at least ten chips.

12. The lighting system according to claim 2, wherein the at least one active light emitter source has variable lighting parameters such as a non-zero value emission intensity of each chip and a color of the at least one active light emitter source.

13. The vehicle according to claim 8, wherein the at least one active light emitter source that includes at least two elementary light emitters is a light-emitting diode with at least two chips, and the at least one active light emitter source has variable lighting parameters such as a non-zero value emission intensity of each chip and a color of the at least one active light emitter source.

* * * * *